united States Patent
Cartwright

(10) Patent No.: US 6,279,953 B1
(45) Date of Patent: Aug. 28, 2001

(54) FLEXIBLE MOUNT FOR AN INTERMEDIATE STEERING COLUMN

(75) Inventor: Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/470,883

(22) Filed: Dec. 22, 1999

(51) Int. Cl.⁷ .................................................. B62D 1/16
(52) U.S. Cl. ........................ 280/779; 280/777; 280/780; 74/492
(58) Field of Search ................... 280/779, 777, 280/780; 74/492

(56) References Cited

U.S. PATENT DOCUMENTS

| | | |
|---|---|---|
| 3,505,897 | 4/1970 | Scheffler et al. . |
| 3,538,784 | 11/1970 | Franchini . |
| 3,578,782 | 5/1971 | Takeomi . |
| 3,696,891 * | 10/1972 | Poe ................................. 188/268 |
| 3,760,649 * | 9/1973 | Decouzon et al. .................... 74/492 |
| 4,185,880 | 1/1980 | Shiomi et al. . |
| 4,297,911 | 11/1981 | Grahn et al. . |
| 4,362,319 * | 12/1982 | Masaki et al. ...................... 280/779 |
| 4,608,881 * | 9/1986 | Tanoue ................................ 74/492 |
| 4,616,522 | 10/1986 | White et al. . |
| 4,655,475 | 4/1987 | Van Gelderen . |
| 4,703,669 * | 11/1987 | Hyodo ................................. 74/492 |
| 4,895,390 | 1/1990 | Fujikawa et al. . |
| 4,895,391 * | 1/1990 | Groat .................................. 280/779 |
| 4,946,195 | 8/1990 | Ioka et al. . |
| 4,951,522 | 8/1990 | Chowdhury et al. . |
| 5,024,118 | 6/1991 | Khalifa et al. . |
| 5,052,715 * | 10/1991 | Ervin et al. ........................ 280/775 |
| 5,081,879 * | 1/1992 | Pidgeon .............................. 74/492 |
| 5,085,467 | 2/1992 | Converse . |
| 5,141,248 | 8/1992 | Haldric et al. . |
| 5,181,435 * | 1/1993 | Khalifa et al. ...................... 74/492 |
| 5,228,359 * | 7/1993 | Thomas .............................. 74/492 |
| 5,356,179 * | 10/1994 | Hildebrandt et al. ................ 280/777 |
| 5,417,452 * | 5/1995 | Khalifa et al. ..................... 280/777 |
| 5,497,675 * | 3/1996 | Brown et al. ....................... 74/492 |
| 5,520,416 * | 5/1996 | Singer, III et al. ................. 280/775 |
| 5,609,063 * | 3/1997 | Hedderly et al. ................... 74/492 |
| 5,613,709 | 3/1997 | Nakamichi . |
| 5,690,363 | 11/1997 | Rybinski . |
| 5,706,704 * | 1/1998 | Riefe et al. ......................... 74/493 |
| 5,732,600 | 3/1998 | Peterson et al. . |
| 5,755,461 * | 5/1998 | Halacka et al. ..................... 280/777 |
| 5,819,592 * | 10/1998 | Lewandowski et al. ............. 74/492 |
| 5,820,163 * | 10/1998 | Thacker et al. .................... 280/775 |

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

A steering system (10) includes a vehicle steering mechanism (34) which, when actuated, turns steerable wheels (12) of a vehicle. The vehicle steering mechanism (34) is mounted for limited movement in opposite directions from a normal position. An intermediate steering column (26) includes first and second column members (28, 30) which are axially movable relative to each other. The first and second column members (28, 30) are rotatable together about a common axis. The first column member (28) is connected with the steering mechanism (34) to actuate the steering mechanism upon rotation of the first column member. The first and second column members (28, 30) move axially relative to each other upon movement of the vehicle steering mechanism (34) from the normal position. A flexible mount (70) for the second column member (30) elastically deforms in the event the steering mechanism (34) moves from the normal position and the first and second column members (28, 30) fail to move axially relative to each other.

6 Claims, 2 Drawing Sheets

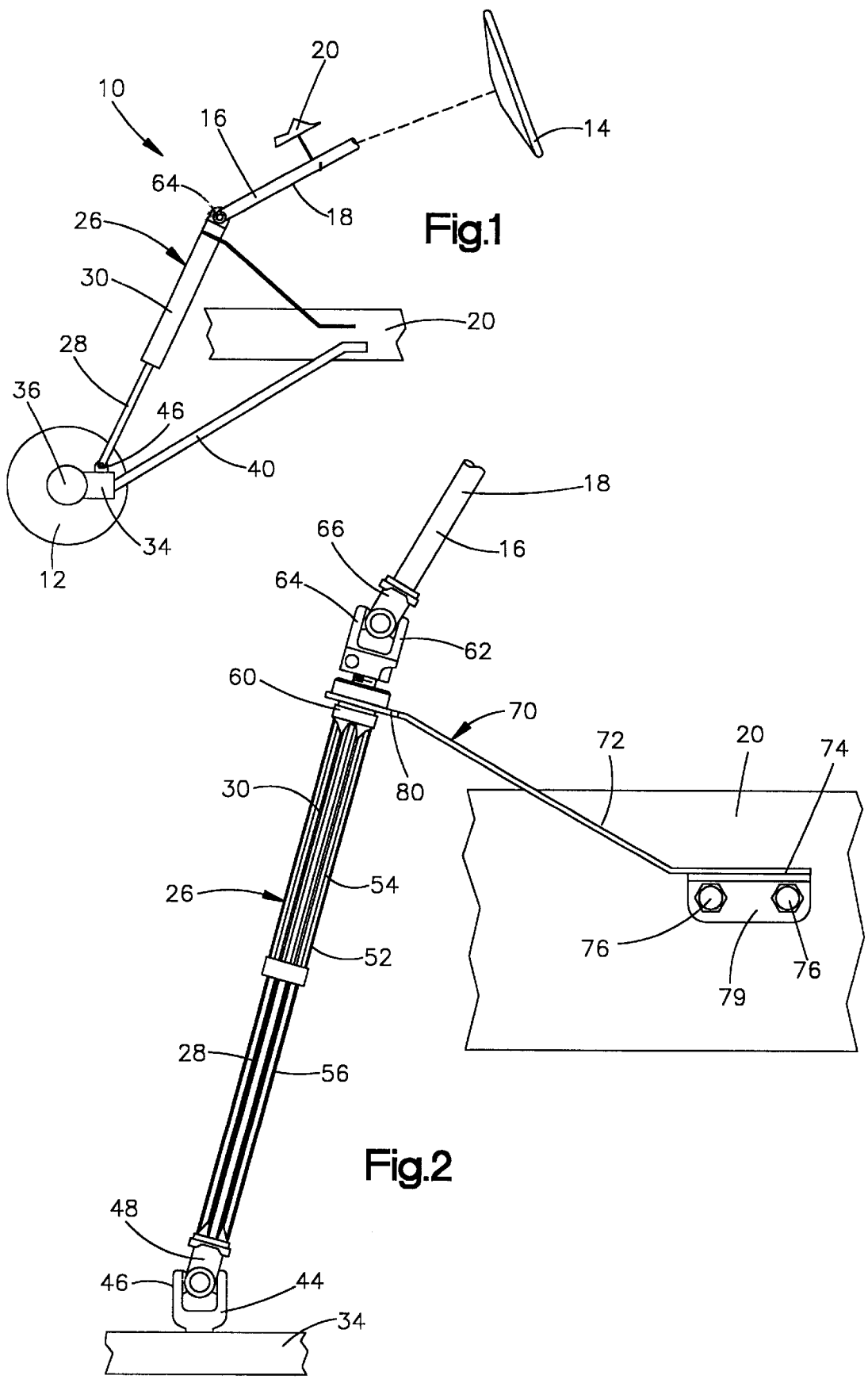

FLEXIBLE MOUNT FOR AN INTERMEDIATE STEERING COLUMN

FIELD OF THE INVENTION

The present invention relates to mounting an intermediate steering column in a vehicle.

BACKGROUND OF THE INVENTION

An intermediate steering column is connected with an upper steering column, which is connected with a steering wheel, and a steering mechanism. Upon rotation of the steering wheel, the intermediate steering column rotates to actuate the steering mechanism. The steering mechanism turns steerable wheels of a vehicle when actuated.

The intermediate steering column includes first and second column members which are axially movable relative to each other. The first column member is connected with the steering mechanism to actuate the steering mechanism upon rotation of the first column member. The second column member is connected with the upper steering column. The first and second column members move axially relative to each other upon movement of the vehicle steering mechanism from a normal position.

SUMMARY OF THE INVENTION

The present invention is an apparatus including a vehicle steering mechanism which, when actuated, turns steerable wheels of a vehicle. The vehicle steering mechanism is mounted for limited movement in opposite directions from a normal position. An intermediate steering column includes first and second column members which are axially movable relative to each other. The first and second column members are rotatable together about a common axis.

The first column member is connected with the steering mechanism to actuate the steering mechanism upon rotation of the first column member. The first and second column members move axially relative to each other upon movement of the vehicle steering mechanism from the normal position. A flexible mount for the second column member elastically deforms in the event the steering mechanism moves from the normal position and the first and second column members fail to move axially relative to each other.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of a vehicle steering system;

FIG. 2 is an enlarged schematic view of an intermediate steering column of the steering system of FIG. 1 and a flexible mount for the intermediate steering column.

DESCRIPTION OF A PREFERRED EMBODIMENT

Figure 3:
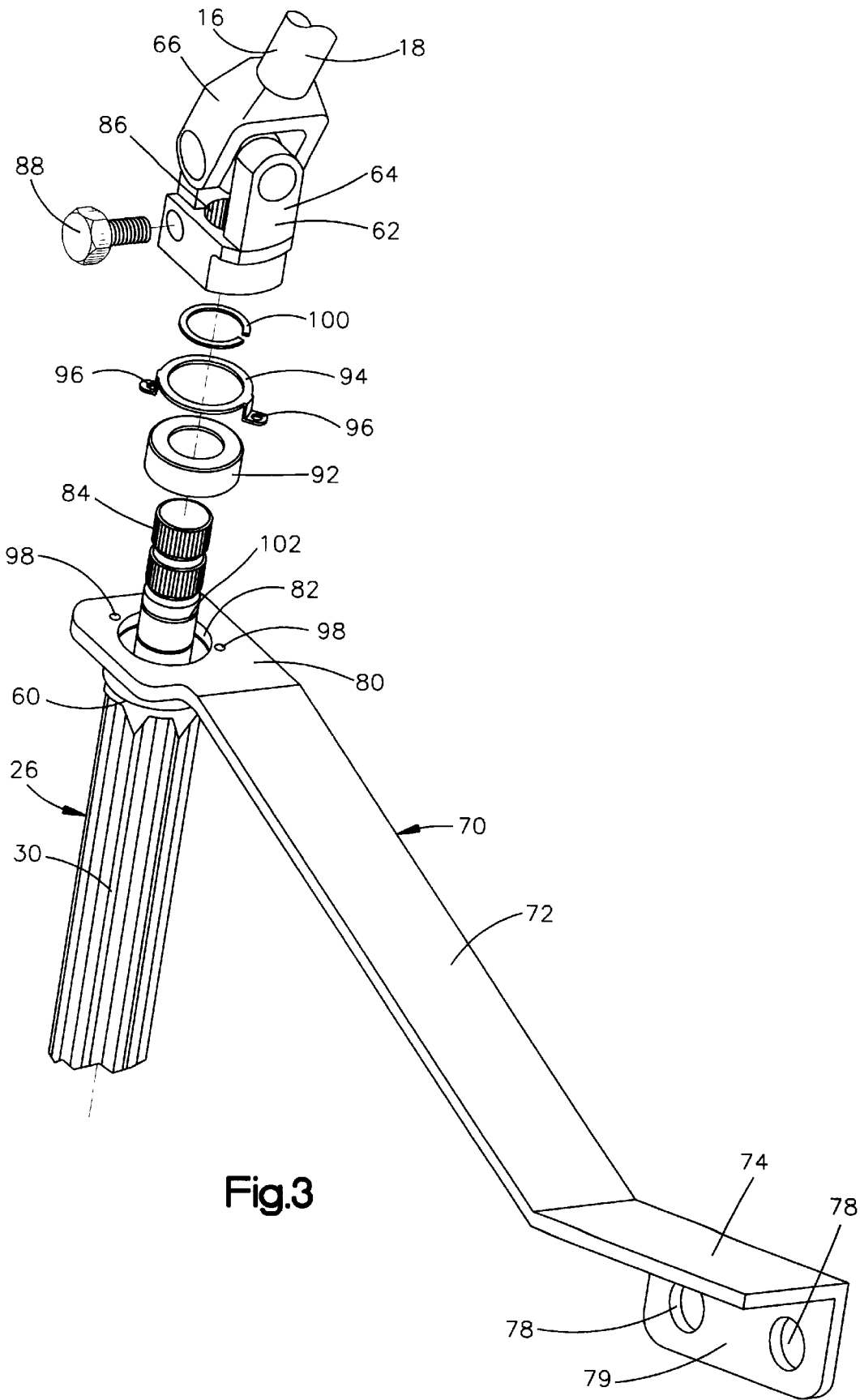
FIG. 3 is an exploded schematic view showing how the intermediate steering column of FIG. 2 is connected to the flexible mount.

The present invention relates to a steering system for turning steerable wheels of a vehicle. As representative of the present invention, FIG. 1 illustrates schematically a steering system 10. The steering system 10 turns steerable wheels 12, one of which is shown in FIG. 1, upon rotation of a steering wheel 14 by a driver of the vehicle.

An upper steering column 16 is connected with the steering wheel 14 and rotates with the steering wheel. The upper steering column 16 could include a pair of steering column members which are axially movable relative to each other. The upper steering column 16 has at least one steering column member 18 which is connected to a frame 20 of the vehicle. The upper steering column 16 may be connected to the frame 20 in any manner known in the art.

One end of the steering column member 18 is connected with an intermediate steering column 26. The intermediate steering column 26 includes steering column members 28 and 30 which are axially movable relative to each other. The column members 28 and 30 rotate together about a common axis. One end of the steering column member 28 is connected with a steering mechanism 34.

The steering mechanism 34 is mounted on an axle 36 of the steerable wheels 12. The steering mechanism 34 may have any construction known in the art. The steering mechanism 34, when actuated, turns the steerable wheels 12 of the vehicle as is known in the art. The steering mechanism 34 is mounted to the vehicle frame 20 by a mounting member 40. The steering mechanism 34 is mounted on the axle 36 for limited movement in opposite directions from a normal position, shown in FIG. 1.

The steering mechanism 34 is connected to a yoke 44 (FIG. 2) of a universal joint 46. Another yoke 48 of the universal joint 46 is connected to the column member 28. The steering column member 28 can pivot relative to the steering mechanism 34 about a pivot axis of the universal joint 46 extending transverse to the axis of rotation of the column member 28. When the column member 28 rotates, the steering mechanism 34 is actuated to turn the steerable vehicle wheels 12.

The column member 28 extends into a tubular shaft portion 52 of the column member 30. The tubular shaft portion 52 has internal splines 54 which mesh with external splines 56 on the column member 28. The splines 54 of the column member 30 mesh with the splines 56 of the column member 28 to effect rotation of the column member 28 upon rotation of the column member 30 about the axis of rotation.

An axial end portion 60 of the column member 30 is connected to a yoke 62 of a universal joint 64. Another yoke 66 of the universal joint 64 is connected to the column member 18 of the upper steering column 16. The column member 18 can pivot, relative to the column member 30, about a pivot axis of the universal joint 64 extending transverse to the axis of rotation of the column member 30. When the column member 18 rotates, the column member 30 and the column member 28 rotate about their common axis.

When the steering wheel 14 rotates, the upper steering column 16 rotates. Rotation of the upper steering column 16 causes rotation of the intermediate steering column 26. Rotation of the intermediate steering column 26 actuates the steering mechanism 34 to turn the steerable wheels 12.

A flexible mount 70 (FIGS. 2 and 3) connects the axial end portion 60 of the column member 30 to the vehicle frame 20. The flexible mount 70 elastically deforms in the event the steering mechanism 34 moves from the normal position and the first and second steering column members 28 and 30 do not move axially relative to each other. The flexible mount 70 includes a metal strap 72 with a first end 74 connected to the frame 20 of the vehicle. The end 74 of the strap 72 is connected to the frame 20 of the vehicle by a pair of bolts 76 that extend through openings 78 (FIG. 3) in a flange 79 of the end 74.

An end 80 (FIG. 3) of the strap 72 is connected to the axial end 60 of the column member 30. The end 80 has an opening 82 through which a splined end 84 of the column member 30 extends. The splined end 84 extends into a splined opening 86 in the yoke 62. A bolt 88 fixedly connects the yoke 62 to the splined end 84 of the column member 30.

The splined end 84 extends through a bearing 92 which is fixedly connected to the end 80 of the metal strap 72. A retainer 94 fixedly connects the bearing 92 to the end 80. A pair of fasteners (not shown) extend through openings 96 in the retainer 94 and into openings 98 in the end 80 of the strap 72 to fixedly connect the bearing 92 to the strap. The bearing 92 transmits axially directed force from the column member 30 to the metal strap 72 to elastically deform the strap in the event the column members 28 and 30 fail to move axially relative to each other.

A snap ring 100 retains the bearing 92 on the splined end 84 of the column member 30. The snap ring 100 engages a groove 102 in the splined end 84. The snap ring 100 snaps into the groove 102 to retain the bearing 92 on the column member 30 as known in the art.

If the steering mechanism 34 moves from the normal position shown in FIG. 1, the column members 28 and 30 move axially relative to each other. If the column members 28 and 30 do not move axially relative to each other when the steering mechanism 34 moves from the normal position, axially directed force is transmitted from the column member 30 to the strap 72 by the bearing 92. The axially directed force transmitted to the strap 72 causes the strap to deform and the column member 30 to pivot relative to the column member 18. Accordingly, the steering mechanism 34 can still be actuated by rotation of the steering wheel 14.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a vehicle steering mechanism which, when actuated, turns steerable wheels of a vehicle, said vehicle steering mechanism being mounted for limited movement in opposite directions from a normal position;
    an intermediate steering column comprising first and second column members which are axially movable relative to each other, said first and second column members being rotatable together about a common axis, said first column member being connected with said steering mechanism to actuate said steering mechanism upon rotation of said first column member, said first and second column members moving axially relative to each other upon movement of said vehicle steering mechanism from said normal position; and
    a flexible mount for said second column member, said flexible mount elastically deforming in the event said steering mechanism moves from said normal position and said first and second column members fail to move axially relative to each other.

2. Apparatus as defined in claim 1 wherein said flexible mount comprises a metal strap having opposite first and second ends, said first end being connected with a vehicle frame and said second end being connected with said second column member.

3. Apparatus as defined in claim 1 further including a third rotatable column member, a universal joint connecting said third column member to said second column member for joint rotation and for relative pivotal movement about an axis transverse to the axis of rotation of said second column member, said flexible mount, when elastically deforming, causing relative pivotal movement of said second and third column members about said transverse axis.

4. Apparatus as defined in claim 3 wherein said flexible mount comprises a metal strap having opposite first and second ends, said first end being connected with a vehicle frame and said second end being connected with said second column member.

5. Apparatus comprising:
    a vehicle steering mechanism which, when actuated, turns steerable wheels of a vehicle, said vehicle steering mechanism being mounted for limited movement in opposite directions from a normal position;
    an intermediate steering column comprising first and second column members which are axially movable relative to each other, said first and second column members being rotatable together about a common axis, said first column member being connected with said steering mechanism to actuate said steering mechanism upon rotation of said first column member, said first and second column members moving axially relative to each other upon movement of said vehicle steering mechanism from said normal position;
    a flexible mount for said second column member, said flexible mount elastically deforming in the event said steering mechanism moves from said normal position and said first and second column members fail to move axially relative to each other, said flexible mount comprising a metal strap having opposite first and second ends, said first end being connected with a vehicle frame and said second end being connected with said second column member; and
    a bearing interposed between said second column member and said strap, said bearing transmitting axially directed force from said second column member to said strap to elastically deform said strap in the event said first and second column members fail to move axially relative to each other.

6. Apparatus comprising:
    a vehicle steering mechanism which, when actuated, turns steerable wheels of a vehicle, said vehicle steering mechanism being mounted for limited movement in opposite directions from a normal position;
    an intermediate steering column comprising first and second column members which are axially movable relative to each other, said first and second column members being rotatable together about a common axis, said first column member being connected with said steering mechanism to actuate said steering mechanism upon rotation of said first column member, said first and second column members moving axially relative to each other upon movement of said vehicle steering mechanism from said normal position;
    a flexible mount for said second column member, said flexible mount elastically deforming in the event said steering mechanism moves from said normal position and said first and second column members fail to move axially relative to each other;
    a third rotatable column member, a universal joint connecting said third column member to said second column member for joint rotation and for relative pivotal movement about an axis transverse to the axis of rotation of said second column member, said flexible mount, when elastically deforming, causing relative pivotal movement of said second and third column members about said transverse axis;

said flexible mount comprising a metal strap having opposite first and second ends, said first end being connected with a vehicle frame and said second end being connected with said second column member; and a bearing interposed between said second column member and said strap, said bearing transmitting axially directed force from said second column member to said strap to elastically deform said strap in the event said first and second column members fail to move axially relative to each other.

\* \* \* \* \*